United States Patent
Bush et al.

(10) Patent No.: US 8,514,816 B2
(45) Date of Patent: *Aug. 20, 2013

(54) LOCATION DETERMINATION USING FORMULA

(75) Inventors: Jeffrey Alan Bush, San Jose, CA (US); Ronald Keryuan Huang, Milpitas, CA (US); Daryl Mun-Kid Low, Cupertino, CA (US); Rudolph van der Merwe, Portland, OR (US); Richard Eugene Crandall, Portland, OR (US); Patrick Block Carlisle, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/539,206

(22) Filed: Jun. 29, 2012

(65) Prior Publication Data

US 2012/0264460 A1    Oct. 18, 2012

Related U.S. Application Data

(63) Continuation of application No. 12/103,330, filed on Apr. 15, 2008, now Pat. No. 8,213,389.

(51) Int. Cl.
*H04W 4/00* (2009.01)

(52) U.S. Cl.
USPC .......................................................... 370/334

(58) Field of Classification Search
USPC .............................. 370/328–339; 455/456.3; 342/357.21–357.31, 357.39
See application file for complete search history.

(56) References Cited

U.S. PATENT DOCUMENTS

| | | | |
|---|---|---|---|
| 5,463,725 | A | 10/1995 | Henckel et al. |
| 5,508,707 | A | 4/1996 | LeBlanc et al. |
| 6,091,956 | A | 7/2000 | Hollenberg |
| 6,281,811 | B1 | 8/2001 | Ranzino |
| 6,323,846 | B1 | 11/2001 | Westerman et al. |
| 6,414,635 | B1 | 7/2002 | Stewart et al. |
| 6,421,066 | B1 | 7/2002 | Sivan |
| 6,525,687 | B2 | 2/2003 | Roy et al. |
| 6,570,557 | B1 | 5/2003 | Westerman et al. |
| 6,662,016 | B1 | 12/2003 | Buckham et al. |
| 6,677,932 | B1 | 1/2004 | Westerman |
| 6,711,408 | B1 | 3/2004 | Raith |
| 6,732,047 | B1 | 5/2004 | De Silva |

(Continued)

FOREIGN PATENT DOCUMENTS

| | | |
|---|---|---|
| EP | 0 633 452 | 1/1995 |
| EP | 0 762 362 | 3/1997 |

(Continued)

OTHER PUBLICATIONS

GPSMap60 owner's manual, GPS Navigation, Garmin Ltd., Mar. 31, 2006, pg. 8-9.

(Continued)

*Primary Examiner* — Frank Duong
(74) *Attorney, Agent, or Firm* — Fish & Richardson P.C.

(57) ABSTRACT

Among other disclosed subject matter, a method includes obtaining, in a mobile device, power information indicating a detected power of respective signals received from multiple transmitters. The method includes determining a location of the mobile device using a formula that uses: locations of the multiple transmitters, a first function of the power information and a second function of respective locations of the multiple transmitters. The method can include recording the determined location.

28 Claims, 7 Drawing Sheets

(56) References Cited

U.S. PATENT DOCUMENTS

| | | | |
|---|---|---|---|
| 6,865,395 B2 | 3/2005 | Riley | |
| 6,888,536 B2 | 5/2005 | Westerman et al. | |
| 6,946,956 B2 | 9/2005 | Hayashi et al. | |
| 6,978,206 B1 | 12/2005 | Pu et al. | |
| 7,089,264 B1 | 8/2006 | Guido et al. | |
| 7,130,646 B2 | 10/2006 | Wang | |
| 7,373,246 B2 | 5/2008 | O'Clair | |
| 7,587,345 B2 | 9/2009 | Mann et al. | |
| 7,768,395 B2 | 8/2010 | Gold | |
| 7,818,017 B2 | 10/2010 | Alizadeh-Shabdiz et al. | |
| 2002/0032035 A1 | 3/2002 | Teshima | |
| 2002/0145557 A1* | 10/2002 | Roy et al. | 342/357.02 |
| 2003/0023376 A1 | 1/2003 | Fujimoto et al. | |
| 2003/0032404 A1 | 2/2003 | Wager et al. | |
| 2003/0060215 A1 | 3/2003 | Graham | |
| 2003/0096620 A1 | 5/2003 | Ozturk et al. | |
| 2003/0120423 A1 | 6/2003 | Cochlovius et al. | |
| 2004/0021566 A1* | 2/2004 | Hayashi et al. | 340/539.13 |
| 2004/0104842 A1 | 6/2004 | Drury et al. | |
| 2004/0198397 A1 | 10/2004 | Weiss | |
| 2006/0064239 A1 | 3/2006 | Ishii | |
| 2006/0085392 A1 | 4/2006 | Wang et al. | |
| 2006/0101005 A1 | 5/2006 | Yang et al. | |
| 2006/0247855 A1 | 11/2006 | de Silva et al. | |
| 2006/0268795 A1 | 11/2006 | Tamaki | |
| 2006/0271280 A1 | 11/2006 | O'Clair | |
| 2007/0001867 A1 | 1/2007 | Rowe et al. | |
| 2007/0008515 A1 | 1/2007 | Otani et al. | |
| 2007/0071114 A1 | 3/2007 | Sanderford et al. | |
| 2007/0073480 A1 | 3/2007 | Singh | |
| 2007/0150444 A1* | 6/2007 | Chesnais et al. | 707/3 |
| 2007/0162224 A1 | 7/2007 | Luo | |
| 2007/0191029 A1 | 8/2007 | Zarem et al. | |
| 2008/0045138 A1 | 2/2008 | Milic-Frayling et al. | |
| 2008/0132170 A1 | 6/2008 | Alizadeh-Shabdiz et al. | |
| 2008/0225779 A1 | 9/2008 | Bragiel et al. | |
| 2008/0227473 A1 | 9/2008 | Haney | |
| 2008/0287124 A1 | 11/2008 | Karabinis | |
| 2009/0042585 A1 | 2/2009 | Matsuda | |
| 2009/0177385 A1 | 7/2009 | Matas et al. | |
| 2009/0219209 A1 | 9/2009 | Bush et al. | |
| 2009/0258660 A1 | 10/2009 | Bush et al. | |
| 2009/0271271 A1 | 10/2009 | Johnson | |
| 2010/0082820 A1 | 4/2010 | Furukawa | |
| 2011/0051658 A1 | 3/2011 | Jin et al. | |

FOREIGN PATENT DOCUMENTS

| | | |
|---|---|---|
| EP | 0 917 385 | 5/1999 |
| EP | 1 251 362 | 10/2002 |
| EP | 1 445 970 | 8/2004 |
| EP | 1469287 | 10/2004 |
| EP | 1 672 474 | 6/2006 |
| EP | 1 768 280 | 3/2007 |
| EP | 1 975 567 | 10/2008 |
| WO | 02/03093 | 1/2002 |
| WO | 02/33533 | 4/2002 |
| WO | 2003/005750 | 1/2003 |
| WO | 2004/034194 | 4/2004 |
| WO | 2005/006258 | 1/2005 |
| WO | 2006/096923 | 9/2006 |
| WO | 2008/025013 | 2/2008 |
| WO | 2009/002942 | 2/2009 |

OTHER PUBLICATIONS

Authorized Officer Jacqueline Pitard, European Patent Office, International Search Report and the Written Opinion of the International Searching Authority, dated Dec. 9, 2009, 28 pp. (Appln No. PCT/US2009/033110).

European Authorized Officer Marie Ghilini, Invitation to Pay Additional Fees and, Where Applicable, Protest Fee for Application No. PCT/US2009/033110, filed Jul. 23, 2009, 10 pages.

International Preliminary Report on Patentability for Application No. PCT/US2009/033110, dated Sep. 10, 2010, 12 pages.

"Notification of Transmittal of International Search Report and the Written Opinion of the International Searching Authority" mailed Jun. 16, 2009; International appln No. PCT/US2009/040573, filing date Apr. 14, 2009.

Office Action in DE 10 2009 017490.7-55 mailed Jul. 22, 2011, 9 pages (English translation is included.).

Chinese Examiner Liu Mei, Office Action for Chinese Patent Application No. 200910203904.3, dated Jun. 24, 2011, 8 pages.

Examiner Mr. Simin Baharlou, International Preliminary Report on Patentability for Application No. PCT/US2009/040573, dated Oct. 28, 2010, 8 pages.

"GPS: An Introduction" [online]. Remote Sensing & GIS, Jun. 9, 2007, [retrieved on Apr. 15, 2009]. Retrieved from the Internet: <URL: http://rgislearn.blogspot.com/2007/06/gps-introduction.htlm>.

"RFID Basics: Antenna Gain and Range" [online] RF Design Line, Oct. 16, 2007, [retrieved on Apr. 15, 2009]. Retrieved from the Internet: <URL: http://www.rfdesignline.com/202402072?printableArticle=true>.

European Search Report dated Apr. 28, 2009, Application No. 09000094.4.

International Search Report dated May 7, 2009, International Appln No. PCT/US2009/030134.

Singh, R., et al., "Location Determination using WLAN in Conjunction with GPS Network (Global Positioning System)," Vehicular Technology Conference, 2004. VTC 2004-Spring. 2004 IEEE 59th Milan, Italy, May 17-19, 2004, Piscataway, NJ USA, IEEE, US, vol. 5, May 17, 2004, pp. 2695-2699, XP010766738.

Partial European Search Report dated Jan. 2, 2012, European Application No. 09005365.3, 5 pages.

* cited by examiner

LOCATION DETERMINATION USING FORMULA

CROSS-REFERENCE TO RELATED APPLICATION

This application is a continuation of and claims priority to U.S. application Ser. No. 12/103,330, entitled "Location Determination Using Formula," filed on Apr. 15, 2008, the entire contents of which is incorporated herein by reference.

TECHNICAL FIELD

This specification is related generally to location determination using a formula.

BACKGROUND

The increased importance of processor-based devices has made navigation services and other forms of location determination available to a substantial number of users. For example, online services are now available that can provide maps, directions, navigation information and other information relating to the geography of places on Earth and also in the sky.

Some devices are intended for portable use and are therefore sometimes referred to as mobile. Some of them rely on a form of radio communication to connect to a home station, a network or some other base, with which information can be exchanged. With some mobile devices the range of radio signal coverage is substantial and the users can therefore operate the device anywhere in a significant geographic area. This ability to move around with the device also increases the need to determine the location of the device, to a more or less exact geographic position. Some technologies have been introduced in this regard, including Global Positioning System (GPS) and other approaches that use signals from transmitters on the ground.

SUMMARY

The invention relates to location determination using a formula.

In a first aspect, a method includes obtaining, in a mobile device, power information indicating a detected power of respective signals received from a plurality of transmitters. The method includes determining a location of the mobile device based at least in part on: locations of the plurality of transmitters, a first function of the power information and a second function of respective locations of the plurality of transmitters.

Implementations can include any, all or none of the following features. The method can further include displaying a map on a display of the mobile device; receiving a user input in the mobile device indicating a request for the location to be determined; and placing, in response to the user input, a first indicator on the map corresponding to the determined location and a second indicator indicating a determined certainty of the determined location. The location can be determined based at least in part on a formula that depends on a $\log_{10}$ of the detected power and a $\log_{10}$ of a modeled transmitter power. The $\log_{10}$ of the modeled transmitter power can have a linear relationship with a $\log_{10}$ of a distance between any of the plurality of transmitters and the mobile device. The linear relationship can be: $10 \log_{10} F_n := 10 \log_{10} \gamma - 10\alpha L$ wherein $F_n$ is the modeled transmitter power of an nth transmitter; $\gamma$ and $\alpha$ are values; and L equals $\log_{10} |r-r_n|$ wherein r is the location to be determined and $r_n$ is the location of an nth transmitter. The method can further include determining $\gamma$ and $\alpha$ before determining the location including analyzing detected power of signals received at known locations. The $\log_{10}$ of the modeled transmitter power can have a parabolic relationship with a $\log_{10}$ of a distance between any of the plurality of transmitters and the mobile device. The parabolic relationship can be: $10 \log_{10} F_n := a_0 + a_1 L + a_2 L^2$ wherein $F_n$ is the modeled transmitter power of an nth transmitter; $a_0$, $a_1$ and $a_2$ are values; and L equals $\log_{10} |r-r_n|$ wherein r is the location to be determined and $r_n$ is the location of an nth transmitter. The method can further include determining $a_0$, $a_1$ and $a_2$ before determining the location including analyzing detected power of signals received at known locations. The location can be determined based at least in part on a formula that includes:

$$E := \sum_{n=1}^{N} c_n(r, r_n, P_n)[d_n(P_n) - d_n(F_n)]^\beta.$$

wherein E is an output of an error functional; N is the number of the plurality of transmitters $c_n$ is a penalty term; r is the location of the mobile device; $r_n$ is the location of transmitter n; $P_n$ is the detected power of transmitter n; $d_n$ is a function; $F_n$ is a form factor reflecting a modeled power of transmitter n depending on the location of transmitter n; and wherein the location is determined by finding r so that E is minimized. The method can further include partitioning the plurality of transmitters into groups of a predefined number of transmitters according to all possible groupings of the plurality of transmitters; wherein determining the location comprises determining a preliminary location, for each of the groups, using at least the information indicating the detected power from the transmitters in the group; and selecting the location from among the determined preliminary locations. The location can be selected based on a value of a formula for the corresponding group, the formula using the locations of the plurality of transmitters, the first function and the second function. The location can be selected based on a clustering of the preliminary locations. The method can further include comparing the determined location to a predetermined number of locations determined previously; and rejecting the determined location upon determining that a difference in the determined location exceeds a threshold. The method can further include storing earlier power information indicating a detected power of respective signals received earlier from the plurality of transmitters; comparing the obtained power information with the earlier power information before determining the location. The method can further include removing at least part of the power information for at least one of the plurality of transmitters upon determining that a difference in the detected power for the transmitter exceeds a threshold.

In a second aspect, a computer program product is encoded on a tangible program carrier and operable to cause a portable device to perform operations. The operations comprise obtaining, in a mobile device, power information indicating a detected power of respective signals received from a plurality of transmitters. The operations comprise determining a location of the mobile device based at least in part on: locations of the plurality of transmitters, a first function of the power information and a second function of respective locations of the plurality of transmitters.

In a third aspect, a method includes obtaining, in a mobile device, power information indicating a detected power of respective signals received from a plurality of transmitters.

The method includes determining a location of the mobile device based at least in part on a first function of respective locations of the plurality of transmitters, the first function using at least one value determined by analyzing detected power of signals received at known locations.

Implementations can include any, all or none of the following features. The first function can be:

$$F_n := \frac{\gamma}{|r - r_n|^\alpha}$$

wherein $F_n$ is a modeled transmitter power of an nth transmitter $\gamma 0$ and $\alpha$ are values determined by analyzing detected power of signals received at known locations r is the location to be determined $r_n$ is the location of an nth transmitter. The location can be determined based at least in part on a formula that includes $$E := \sum_{n=1}^{N} c_n(r, r_n, P_n)[d_n(P_n) - d_n(F_n)]^\beta.$$

wherein E is an output of an error functional; N is the number of the plurality of transmitters; $c_n$ is a penalty term; $P_n$ is the detected power of transmitter n; $d_n$ is a function; wherein the location is determined by finding r so that E is minimized.

Particular embodiments of the subject matter described in this specification can be implemented to realize one or more of the following advantages. Location determination can be improved. Modeling of received signal power from a transmitter can be improved. An improved form-factor functional can be used in location determination. An improved cost function can be provided.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
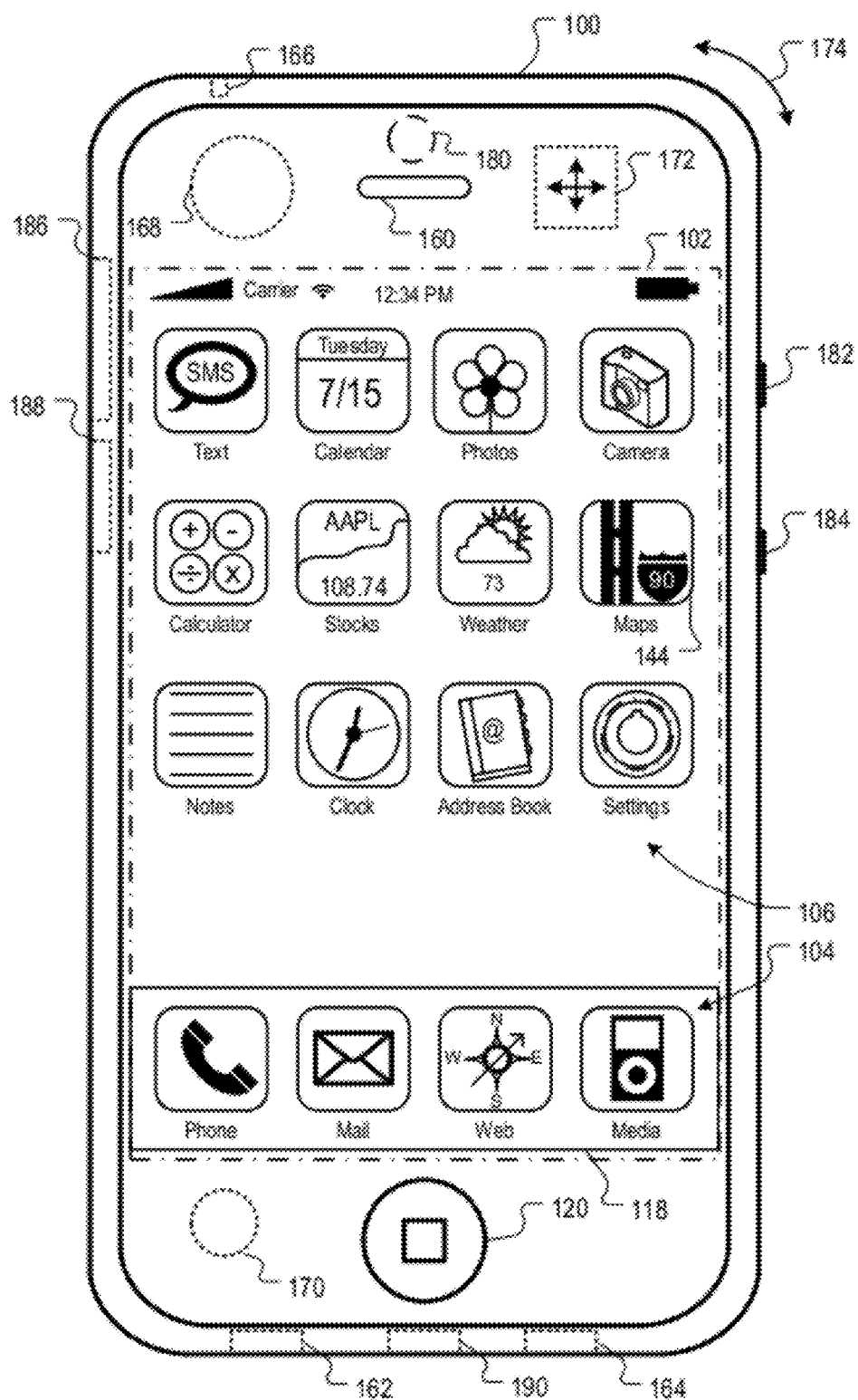
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices. Below will be described examples of determining the location of a device such as the mobile device 100. For example, the mobile device 100 can estimate its current physical location and use this estimate in one or more ways.

In some implementations, the mobile device 100 includes a touch-sensitive display 102. The touch-sensitive display 102 can implement liquid crystal display (LCD) technology, light emitting polymer display (LPD) technology, or some other display technology. The touch sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

In some implementations, the mobile device 100 can implement multiple device functionalities, such as a telephony device, an e-mail device, a network data communication device, a Wi-Fi base station device (not shown), and a media processing device. In some implementations, particular display objects 104 can be displayed in a menu bar 118. In some implementations, device functionalities can be accessed from a top-level graphical user interface, such as the graphical user interface illustrated in FIG. 1. Touching one of the objects 104 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching a phone object, the graphical user interface of the touch-sensitive display 102 may present display objects related to various phone functions; likewise, touching of an email object may cause the graphical user interface to present display objects related to various e-mail functions; touching a Web object may cause the graphical user interface to present display objects related to various Web-surfing functions; and touching a media player object may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object, a calendar object, a photos object, a camera object, a calculator object, a stocks object, a weather object, a maps object 144, a notes object, a clock object, an address book object, and a settings object. Touching the maps object 144 can, for example, invoke a mapping and location-based services environment and supporting functionality; likewise, a selection of any of the display objects 106 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the Global Positioning System (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Figure 2:
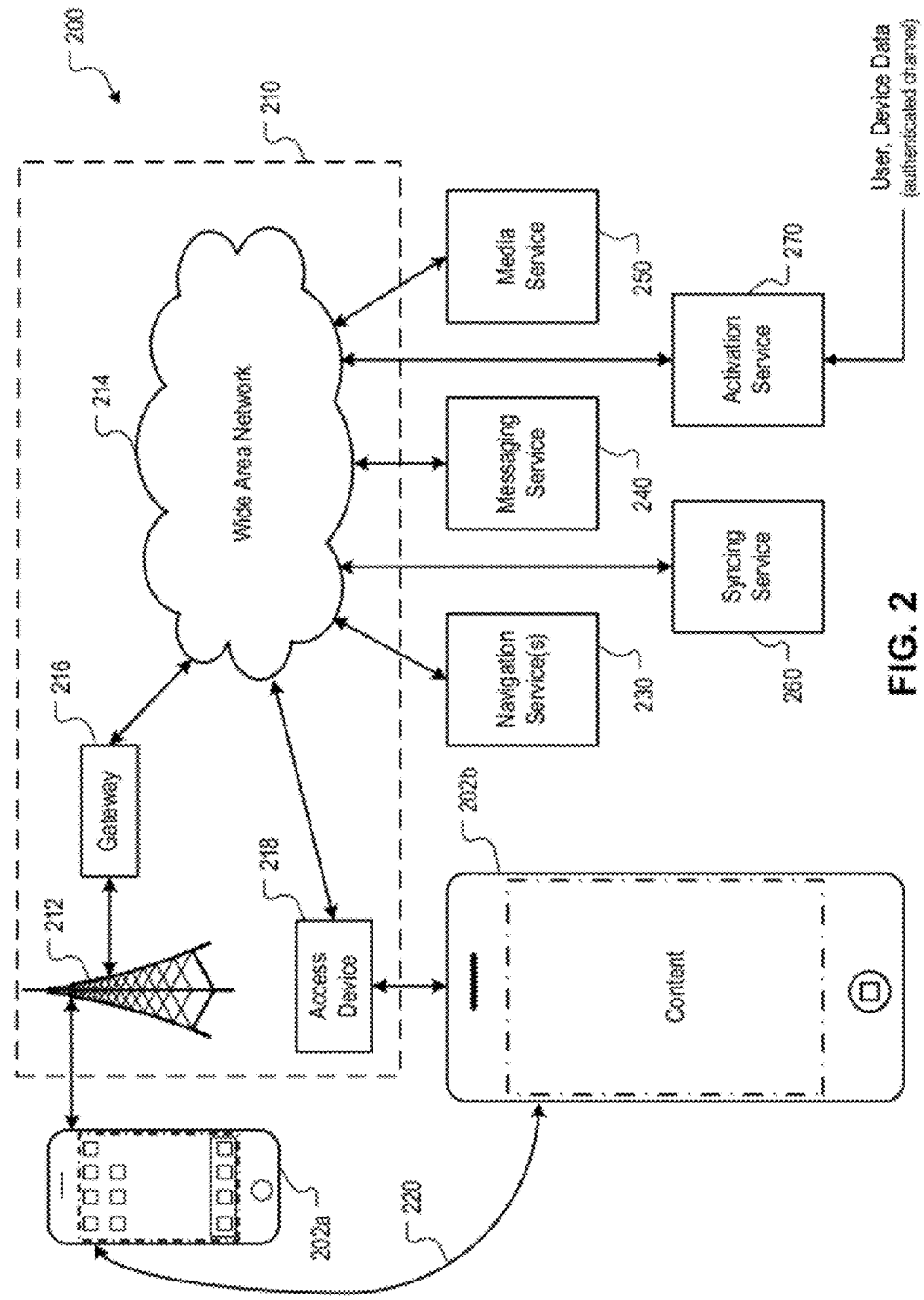
FIG. 2 is a block diagram of an example network operating environment for the mobile device of FIG. 1.

FIG. 2 is a block diagram of an example network operating environment 200. In FIG. 2, mobile devices 202a and 202b each can represent mobile device 100. Mobile devices 202a and 202b can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.11g wireless access device, can provide communication access to the wide area network 214. In some implementations, both voice and data communications can be established over the wireless network 212 and the access device 218. For example, the mobile device 202a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, in some implementations, the mobile device 202b can place and receive phone calls, send and receive e-mail messages, and retrieve electronic documents over the access device 218 and the wide area network 214. In some implementations, the mobile device 202a or 202b can be physically connected to the access device 218 using one or more cables and the access device 218 can be a personal computer. In this configuration, the mobile device 202a or 202b can be referred to as a "tethered" device.

The mobile devices 202a and 202b can also establish communications by other means. For example, the wireless device 202a can communicate with other wireless devices, e.g., other mobile devices 202a or 202b, cell phones, etc., over the wireless network 212. Likewise, the mobile devices 202a and 202b can establish peer-to-peer communications 220, e.g., a personal area network, by use of one or more communication subsystems, such as the Bluetooth™ communication devices 188 shown in FIG. 1. Other communication protocols and topologies can also be implemented.

The mobile device 202a or 202b can, for example, communicate with one or more services 230, 240, 250, 260, and 270 over the one or more wired and/or wireless networks 210. For example, one or more navigation services 230 can provide navigation information, e.g., map information, location information, route information, and other information, to the mobile device 202a or 202b. A user of the mobile device 202b can invoke a map functionality, e.g., by pressing the maps object 144 on the top-level graphical user interface shown in FIG. 1, and can request and receive a map for a particular location, request and receive route directions, or request and receive listings of businesses in the vicinity of a particular location, for example.

A messaging service 240 can, for example, provide e-mail and/or other messaging services. A media service 250 can, for example, provide access to media files, such as song files, audio books, movie files, video clips, and other media data. In some implementations, separate audio and video services (not shown) can provide access to the respective types of media files. A syncing service 260 can, for example, perform syncing services (e.g., sync files). An activation service 270 can, for example, perform an activation process for activating the mobile device 202a or 202b. Other services can also be provided, including a software update service that automatically determines whether software updates exist for software on the mobile device 202a or 202b, then downloads the software updates to the mobile device 202a or 202b where the software updates can be manually or automatically unpacked and/or installed.

The mobile device 202a or 202b can also access other data and content over the one or more wired and/or wireless networks 210. For example, content publishers, such as news sites, RSS feeds, web sites, blogs, social networking sites, developer networks, etc., can be accessed by the mobile device 202a or 202b. Such access can be provided by invocation of a web browsing function or application (e.g., a browser) in response to a user touching, for example, a Web object.

Figure 3:
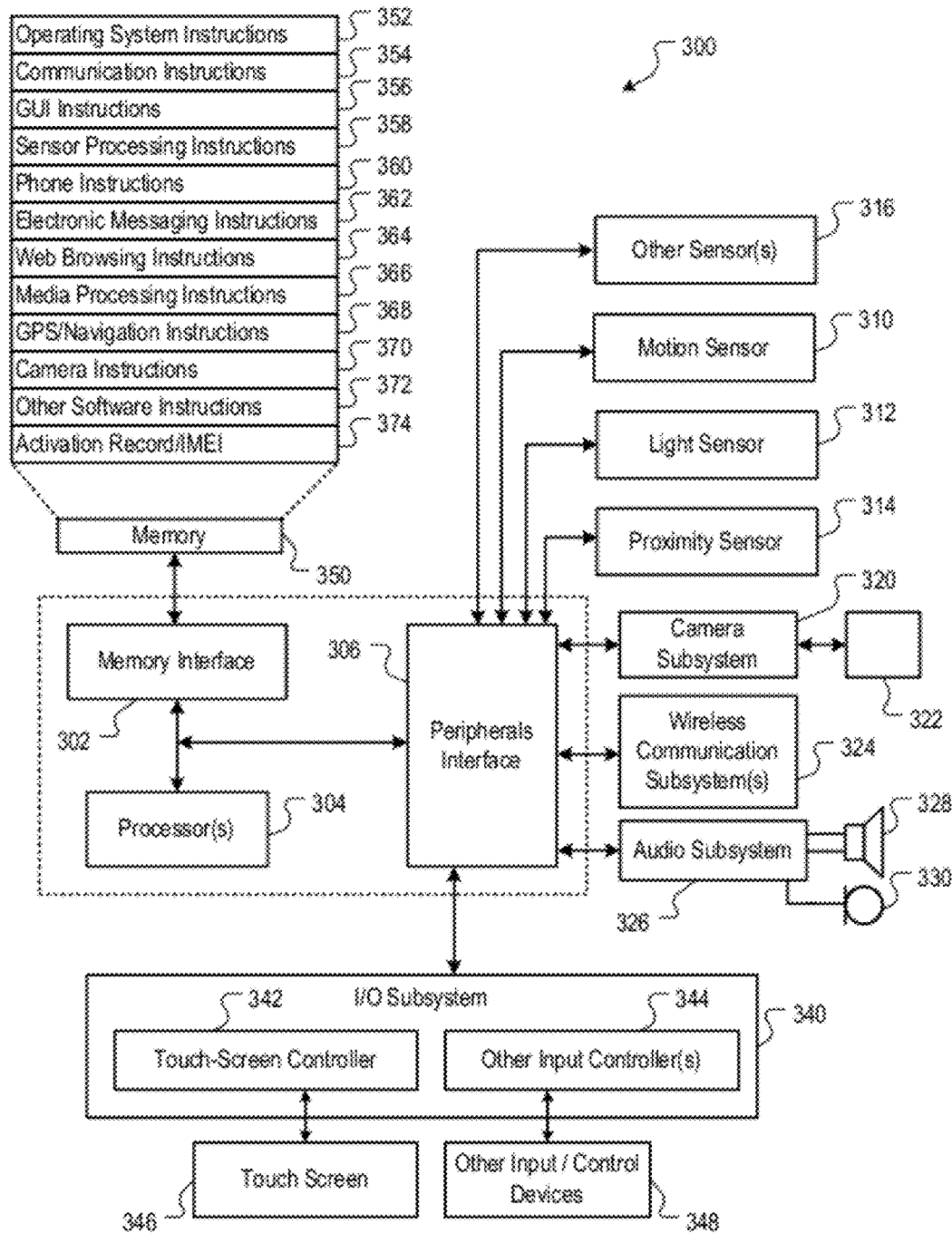
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., security processes and functions. In some implementations, some or all of the instruction 368 can be executed to determine a location of the mobile device 100, for example using information indicating a power detected from one or more transmitters. The instructions 358 can be configured so that also one or more, or all, of the other instructions in the memory 350 can be used in performing a function. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device 100 may be implemented in hardware and/or in software, including in one or more signal processing and/or application specific integrated circuits.

Figure 4:
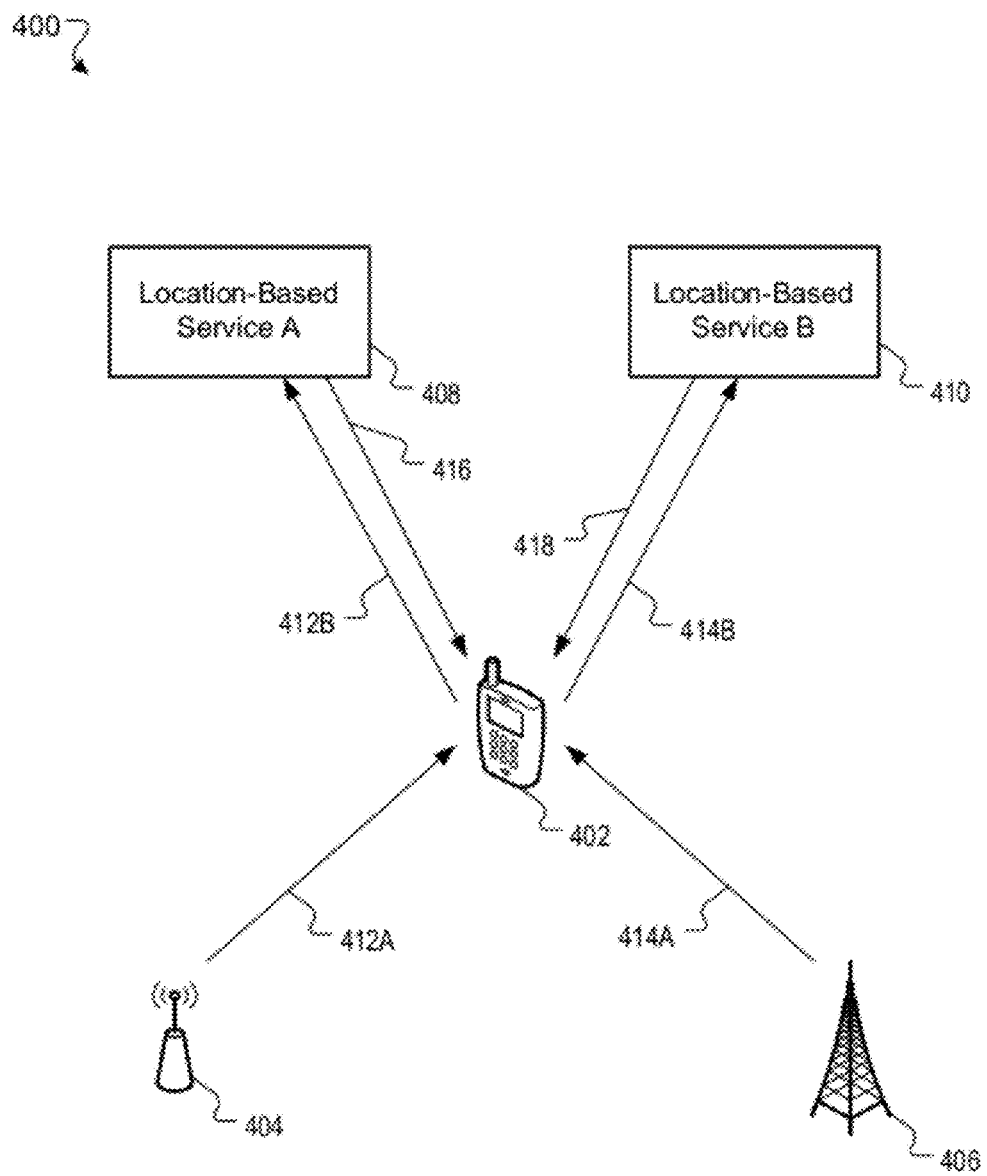
FIG. 4 illustrates an example implementation of a navigation system.

FIG. 4 illustrates an example implementation of a navigation system 400. In FIG. 4, mobile device 402 can represent mobile device 100. The mobile device 402 can, for example, communicate to one or more network access points 404 (e.g., Wi-Fi base station devices) or one or more cell towers 406. In some implementations, the access points 404 can be any combination of 802.11b/g wireless routers, 802.11n wireless routers, and some other Wi-Fi devices that implement any suitable Wi-Fi or other wireless networking technology or protocol. Using the communication with the access points 404 or the cell towers 406, a location-based service 408 (Location-Based Service A) or a location-based service 410 (Location-Based Service B) can estimate geographic areas where the mobile device 402 is currently located. The actual location of the mobile device 402 can be anywhere within the estimated geographic area. An estimated geographic area is not necessarily circular but can be indicated as a circular area on a map display for convenience.

The mobile device 402 can, for example, receive a communication 412A from an access point 404 (e.g., a Wi-Fi access point). The communication 412A can include information about the access point 404, e.g., the Internet Protocol (IP) address and/or the Media Access Control (MAC) address of the access point 404. The communication 412A can include other information, such as the latitude and longitude of the access point 404. The information received in communication 412A can be sent to the location-based service 408 in communication 412B. The location-based service 408 can, for example, with a degree of certainty, uncertainty or error, estimate a first geographic area in which the mobile device 402 is currently located using the information sent in communication 412B. In some implementations, the location-based service 408 is a system or service that estimates, with some degree of certainty, uncertainty or error, the position of a device using a database of access points mapped to geographic locations. The accuracy or precision (or the degree of certainty, uncertainty or error) of the estimated position can, for example, be based on the range of the technology, the accuracy of the range, or some other metric. Accuracy or precision of an estimated position can be affected by one or more factors including, for example, inherent properties or limitations of the technology or system, and a level of deployment of the given technology or system (e.g., number of access points or cell towers in the vicinity of the device). In some implementations, part or all of the functionality of the location-based service 408 can be performed in and/or by the mobile device 402. For example, the mobile device 402 in some implementations can estimate its location based on signal from one or more of the access point 404.

In some implementations, the accuracy or precision of the estimated position is stated in units of distance (e.g., "the estimated position is accurate up to 50 meters"). That is, the actual position of the mobile device 402 can be within the accuracy distance from the estimated position. For example, the first geographic area can be a circle centered at the latitude and longitude of the estimated position with a radius equal to the stated accuracy or precision (e.g. 38 meters if the accuracy of the estimated position is up to 38 meters). The first geographic area can alternatively be represented on a map display as a square, rectangle, oval, diamond, triangle, or some other shaped enclosed region.

In some other implementations, unique signatures of multiple access points (e.g. five or more) can be compared to a local cache on the mobile device 402 or a central reference database at location-based service 408 via network communication (e.g. communication 412B can be sent to the location-based service 408). The location-based service 408 can use the unique signatures to estimate the latitude and longitude of the center of the first geographic circle with an m meter radius (e.g., about 20 meters).

In some implementations, location-based service 408 includes positioning services and reference database information provided by SKYHOOK WIRELESS of Boston, Mass.

The mobile device 402 can receive a communication 414A from cell tower 406. The cell communication 414A can include, for example, information identifying the cell tower 406. In some implementations, the cell communication 414A can also include the latitude and longitude of the cell tower 406. The identifying information and/or the latitude and longitude of the cell tower 406 can be sent to the location-based service 410 in communication 414B. The location-based service 410 can estimate a position of the mobile device 402 using the information included in communication 414B and estimate an accuracy of the estimate position. Thus, for example, the location-based service 410 can estimate a second geographic area in which the mobile device 402 is currently located. In some implementations, the second geographic area is represented on a map as a circular region centered at the estimated position and with a radius equal to the accuracy of the estimated position. In some other implementations, the second geographic area can represented on a map by a square or rectangular shaped enclosed region, to name a few additional examples. In some implementations, part or all of the functionality of the location-based service 410 can be performed in and/or by the mobile device 402. For example, the mobile device 402 in some implementations can estimate its location based on signal from one or more of the cell tower 406.

In some implementations, the position and the geographic area of the mobile device 402 can be estimated using a "cell of origin" positioning technology. In some other implementations, for example as will be described below, the second geographic area can be determined by cell tower trilateration.

In implementations where at least a portion of a location determination is performed remotely from the mobile device 402, the first and/or second geographic areas can be sent to the mobile device 402 by one or more of communications 416 and 418, respectively. The mobile device 402 can present, on the touch-sensitive display 102 for example, a map view including an indication of one or more geographic areas The location-based service 408 and location-based service 410 can run on the same device or on separate devices. For example, the location-based services 408 and 410 can run on servers communicating with the mobile device 100 through a network (e.g., WAN 214). The servers can be separate servers or the same server. The location-based services 408 and 410 can alternatively run on the mobile device 402.

The mobile device 402 can, for example, connect to additional devices or services (not shown) for location-based services, instead of, or in addition to the access point 404 and the cell tower 406. Such devices or services could include a Bluetooth™ device, GPS, radio or TV towers, or cellular grids, to name a few examples. For example, the mobile device 402 can connect to peer devices with the Bluetooth™ communication device 188 (FIG. 1) and receive location-based information from other mobile devices and/or Bluetooth™ enabled devices. In some implementations, the mobile device 402 can determine or estimate its position and/or geographic area using other technologies (e.g., GPS). In some implementations, the geographic area determined or estimated using any of these other technologies can be used (e.g., displayed) in lieu of the geographic area estimated using location-based services 408 or 410 (.e.g., Wi-Fi or cellular positioning techniques) if the geographic area determined or estimated using the other technologies is contained entirely within the geographic area estimated using location-based services 408 or 410 and if the other technologies are more accurate or precise according to the priority table stored in the mobile device 402.

Figure 5:
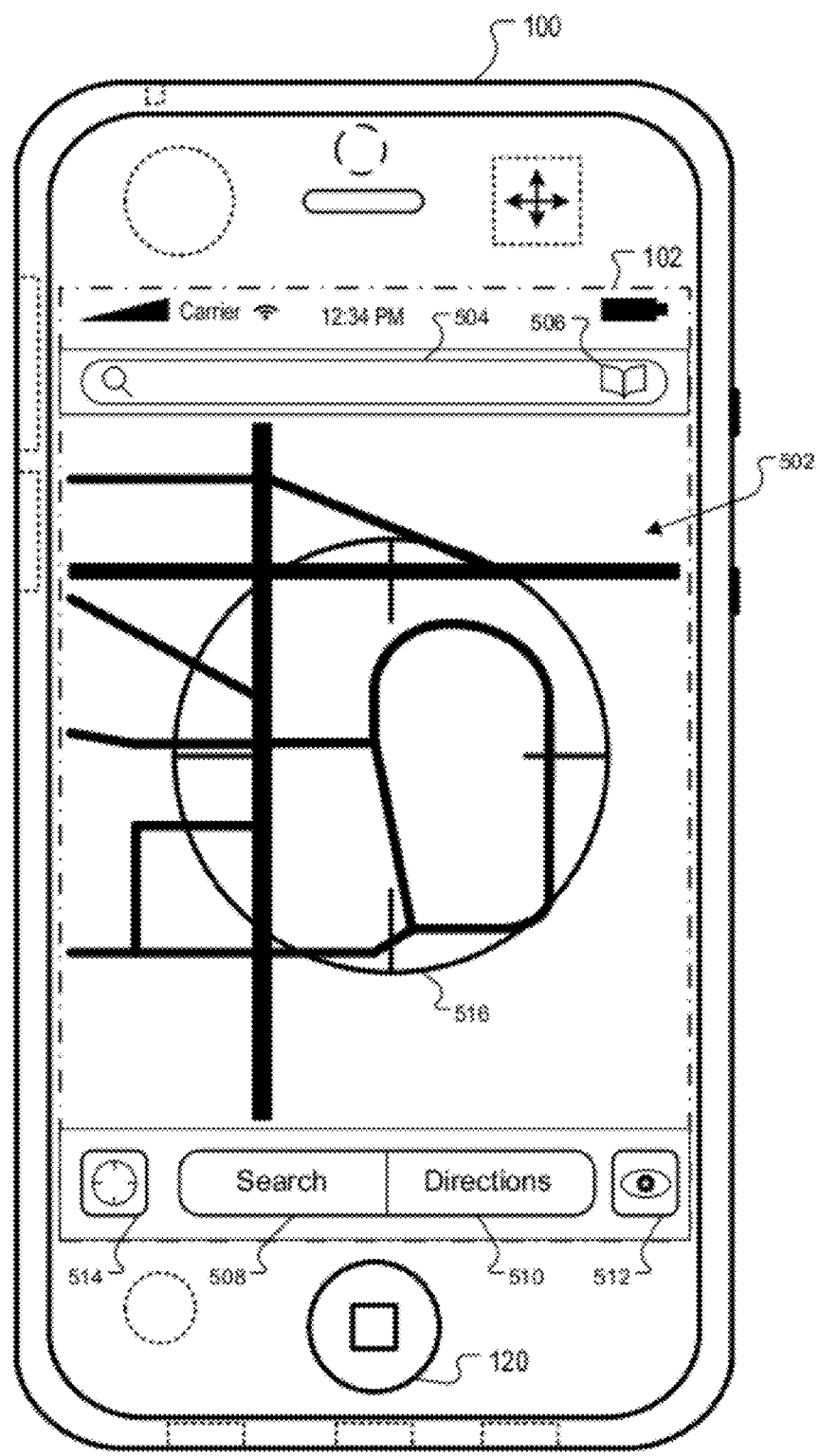
FIG. 5 illustrates an example of a map with a geographic area displayed on the mobile device of FIG. 1.

FIG. 5 illustrates an example of a map 502 with a geographic area displayed on mobile device 100. In some implementations, the mobile device 100 can display the map 502 on the touch sensitive display 102 of mobile device 100. The map 502 can be displayed when a user selects the maps object 144 to view mapping and location based services. In some implementations, objects, such as the maps object 144 (FIG. 1), can be selected by voice activation. A search bar 504 and a bookmarks list object 506 can be displayed at the top of the map 502. Below the bottom of the map one or more display objects can be displayed, for example a search object 508, a directions object 510, a map view object 512, and a current location object 514.

The search bar 504 can be used to find an address or other location on the map. For example, a user can enter their home address in the search bar 504, and the region containing the address would be displayed on the map 502. The bookmarks list object 506 can, for example, bring up a Bookmarks list which contains addresses that are frequently visited, such as a user's home address. The Bookmarks list can also, for example, contain special bookmarks such as the current location, e.g. the current location of the mobile device 100.

The search object 508 can be used to display the search bar 504 and other map related search menus. The directions object 510 can, for example, bring up a menu interface that allows the user to enter a start and end location and then displays information for a route from the start location to the end location, e.g. directions and travel time. The map view object 512 can bring up a menu that will allow the user to select display options for the map 502. The map 502 could be changed from black and white to color, the background of the map could be changed, or the user could change the brightness of the map, to name a few examples.

The current location object 514 can allow the user to see a geographic area 516 on the map 502 indicating where the device 100 is currently located. The special current location bookmark can be placed in the Bookmarks list when the current location object 514 is selected. If the special current location bookmark was previously set in the Bookmarks list, the old bookmark information can, for example, be replaced with the new current location information. In some implementations, the special current location bookmark is tied to the centroid of the geographic area 516. That is, the special current location bookmark includes the address for the centroid of the geographic area 516. The geographic area 516 can be based on location data determined or estimated using location-based services 408 or 410, or some other location data, such as the data previously described in reference to FIG. 4. The geographic area 516 can, for example, be depicted by a circle, rectangle, square, or other enclosed region with crosshairs, or some other distinctive element to differentiate the geographic area 516 from the map 502.

In some implementations, the geographic area 516 indicates a region in which the mobile device 100 is determined or estimated to be located, and the geographic area may not necessarily be centered on the actual current position of the mobile device 100. In this example, the mobile device 100 may be located off-center within the geographic area. In another example, the geographic area 516 can be centered on an estimated current position of the mobile device 100. Thus, in some implementations the map 502 can be presented on the display of the mobile device 100 and a user can make an input with the current location object 514 indicating a request for the location of the mobile device to be determined and/or displayed. In response to the user input, the centroid of the geographic area 516 on the map can correspond to the determined location and the geographic area 516 can indicate a determined certainty or uncertainty of the determined location.

The mobile device 100 can, for example, center the map view on the geographic area 516 when the current location object 514 is tapped or otherwise selected. In some implementations, the zoom level of the map can be adjusted based on the accuracy or precision of the location data or the technology, system, or service that provided the location data. For example, the map can be zoomed in for higher accuracy GPS location data and zoomed out for lower accuracy cell tower or Wi-Fi location data. In another implementation, the zoom level can be based on the velocity of the mobile device 100, e.g. the map can be zoomed out at higher velocities and zoomed in when the mobile device 100 is not moving. A combination of accuracy or precision and velocity can also be used. If all methods for retrieving location-based data fail, e.g. both location-based service A 408 and location-based service B 410 fail and there are no other systems or services available for determining or estimating the current position of the mobile device 100, an error can be displayed to the user and no geographic area is displayed on the map 502. The error can, for example, contain a message to the user informing them of the failure and the possible reason for the failure.

The current location object 514 can be selected, for example, to activate the estimation and displaying of the geographic area 516 on the map 502, to get directions to or from the estimated current location (i.e., the centroid of the geographic area 516), to send the estimated current location of the mobile device 100 to a friend (e.g. so that the friend can go to the same location), or to create a bookmark for the estimated current location, to name a few examples.

In some implementations, location determination can be performed using one or more form-factor formulas. This can allow the mobile device's location amidst N cell phone towers to be determined or estimated, for example. In some implementations, form factors can be found empirically based on an earlier record of detected signal power. In some implementations, the positioning can be performed, in part, by minimizing a form-factor functional.

In some implementations, location determination can involve estimating a current vector position r=(x,y) in the plane, given power readings $(P_1, \ldots, P_N)$ from N cell towers and a database of known locations of the cell towers. Each cell-tower power measurement can be tagged with a unique ID of the originating tower, and this can allow for a lookup of the tower's position $r_n$ in the database. In some implementations, a time-series of readings may be available from some or all the towers, and in such cases a two-dimensional array $P_{k,t}$ can be created, wherein t represents the time and k∈[1, N].

In some implementations, a form factor $F_n$ can be $$F_n := \frac{\gamma}{|r - r_n|^\alpha}$$

wherein γ and α are constants. The form factor equation is a model of the predicted received power. For example, a form factor equation can be used in a minimization process involving a cost function that leads to a estimated position. In some implementations, values for either or both of γ and α, and/or for other constant(s), are derived using best-fit data for single-tower readings versus exact GPS vector locations that were co-recorded with the power measurements. In some implementations, angular factors such as an angular dependence associated with a cardioid antenna pattern, can be taken into account.

In some implementations, best-fit data can be obtained statistically, such as by using a linear and/or a parabolic relationship. For example, received power from multiple cell towers can be arranged as a function of a distance between the mobile device and the tower. In some examples, a $10*\log_{10}$ (i.e., ten times the base ten logarithm) of the received power is plotted as a function of $10*\log_{10}$ of the mobile-tower distance. Then, a function best approximating the arranged data points can be determined, for example as a best linear least-squares fit. In implementations where a linear best-fit is sought, the constant γ can be obtained using a vertical intercept of the best line (e.g., as $10*\log_{10} \gamma$) and the constant α can be obtained using the slope of the best line (e.g., as −10α). As an example, values of γ=0.1166 and α=2.5989 have been selected for one implementation.

In implementations where a parabolic relationship is to be used, the form factor can be expressed as $$10 \log_{10} F_n := a_0 + a_1 L + a_2 L^2$$

wherein $a_0$, $a_1$ and $a_2$ are constants and L equals $\log_{10}|r-r_n|$. That is, in an implementation where the received powers are arranged as a function of the device-tower distance, the data points can be approximated by a best-fit parabola, for example using a least-squares fit. As an example, values of $10 \log_{10} F_n := 159.856 - 133.808 L + 16.964 L^2$ have been selected for one implementation. In some implementations, the choice between a log-linear and log-parabolic algorithms can be a user choice. For example, a person designing the location determine function for the mobile device 100 can choose which of the algorithms to use.

In some implementations, one or more empirically selected values (such as any or all of the constants γ, α and ρ, and/or $a_0$, $a_1$ and $a_2$) can be adjusted. Such adjustment can be performed using cross validation, for example by partitioning the data set into subsets and initially performing the analysis on a single subset, with the other subset(s) being retained for subsequent use in confirming and validating the initial analysis. For example, best-fit linear or parabolic values of the constants can be used as a starting point.

In some implementations, location determination can be organized in terms of:

A) Handling necessary I/O and housekeeping (e.g., reading cell-tower data from file, building a cell-tower database—e.g., a quick lookup hash-table—reading measurement data from file and populating data structures needed by a core estimation routine). As another example, pre-filtering the data set to remove any invalid data points and/or database entries can be performed.

B) Implementing a general estimator main loop and memory management.

C) Implementing one or more form-factor based cost functions, for example in an optimized and/or vectorized form.

D) Providing a library of one or more coordinate transformation routines, for example to convert from a native geodetic (latitude, longitude, altitude) coordinate system in which the cell-tower locations are provided to a locally flat east-north-up Cartesian coordinate system.

In some implementations, the extent of the search grid can be calculated through one of two methods: using time-advance information (if available) or using a minimum single-tower received power. Time-advance information can be available from the main cell-tower (in a given measurement set) which the mobile device is communicating with. This can be an integer number (τ) indicating by how many discretized time-slots the mobile device must advance (in time) the transmission of its data packets in order to arrive at the cell-tower at the correct absolute time. This time can be determined by the time-division multiplexing slots reserved for a given device. This time-advance information can thus provide a crude quantized indication of how far a mobile device is from the communicating cell-tower. Each integer increment can correspond to roughly 550 meters of distance. If this information is available, the search grid can be centered around the main communicating tower and the extent of the grid can be set to a constant factor (ν≧1) times the time-advance measurement times 550 m. In other words:

$$r_{box} = \nu \tau 550.$$

For the minimum single-tower received power case, in contrast, the search grid can be centered at the centroid of the visible cell-tower locations. The extent (boundary) of the grid can be determined using the smallest single-tower received power measurement. For example, it can be assumed that the furthest away cell-tower in a given measurement set will have the lowest power. Using this power measurement, the given form-factor model can be inverted and solved for the magnitude of the unknown separation vector $r=|r-r_n|$. The side-length of the search grid can then be set to δr with δ>2.

For example, a search domain, such as the extent of a search box, can be calculated using either time-advance information or a minimum received power. This can be used as an estimate of the certainty or accuracy of the location determination. For example, with reference to FIG. 5, a radius or other size of the geographic area 516 can be calculated as described above and implemented for display.

The cost function is the functional form used for minimization purposes which can use a form-factor equation and lead to an estimated position. The form-factor based cost function can be evaluated using any technique. For example, a guided search method can be used, such as a first-order gradient descent, second-order quasi-Newton method (e.g., conjugate gradient, Broyden-Fletcher-Goldfarb-Shanno (BFGS) method) or genetic algorithms. In some implementations, a "brute force" search over a discretized 2D grid in the east-north plane can be performed and the least cost value be identified.

A baseline position estimation can be performed based on cell-tower centroid. For example, a weighted mean of the visible cell-tower locations can be determined, with the received linear power acting as the weights. A centroid vector can be used in form-factor based estimations, for example to upper bound a maximum error. For example, if the distance between the estimated position and the location of the centroid is above a certain threshold, some predefined action can be taken. In some implementations, the action can be to reset the estimate to the centroid position. In some implementations, the maximum distance can be 1000-3000 meters, to name just one example. In other implementations the maximum distance can be higher or lower.

In some implementations, the cost function is $$E := \sum_{n=1}^{N} c_n(r, r_n, P_n)[d_n(P_n) - d_n(F_n)]^\beta$$

wherein E is an output of an error functional, N is the number of the multiple transmitters, $c_n$ is a penalty term, r is the location of the mobile device, $r_n$ is the location of transmitter n, $P_n$ is the detected power of transmitter n, $d_n$ is a function, $F_n$ is a form factor reflecting a modeled power of transmitter n depending on the location of transmitter n. Through minimization, obtaining E can lead to an optimal position estimate. For example, the location can be determined by finding r so that E is minimized.

The particular penalty term $c_n$ can be any suitable function. For example, functions such as, but not limited to, the following can be evaluated and/or used as candidates: linear, polynomic, exponential, logarithmic and/or trigonometric functions. As one example, the function $d_n$ can be the $\log_{10}$ function. In some implementations, the exponent $\beta$ can be equal to or about 2.

In some implementations, cost functions are not used when $\log_{10}$ of the modeled power is compared to $\log_{10}$ of the detected power. Sometimes the measured and modeled powers can be directly compared. In these and other situations, the general cost function can be used with the direct (linear) and logarithmic variants as special cases.

In some implementations, $c_n$ can be set to the identity function, $d_n$ can be set to the base-10 logarithm function, and $\beta$ can be set to 2. Then, the following form of the cost function can be obtained:

$$E_2 := \sum_{n=1}^{N} (\log_{10} P_n - \log_{10} F_n)^2$$

wherein terms have the meanings explained above.

Figure 6:
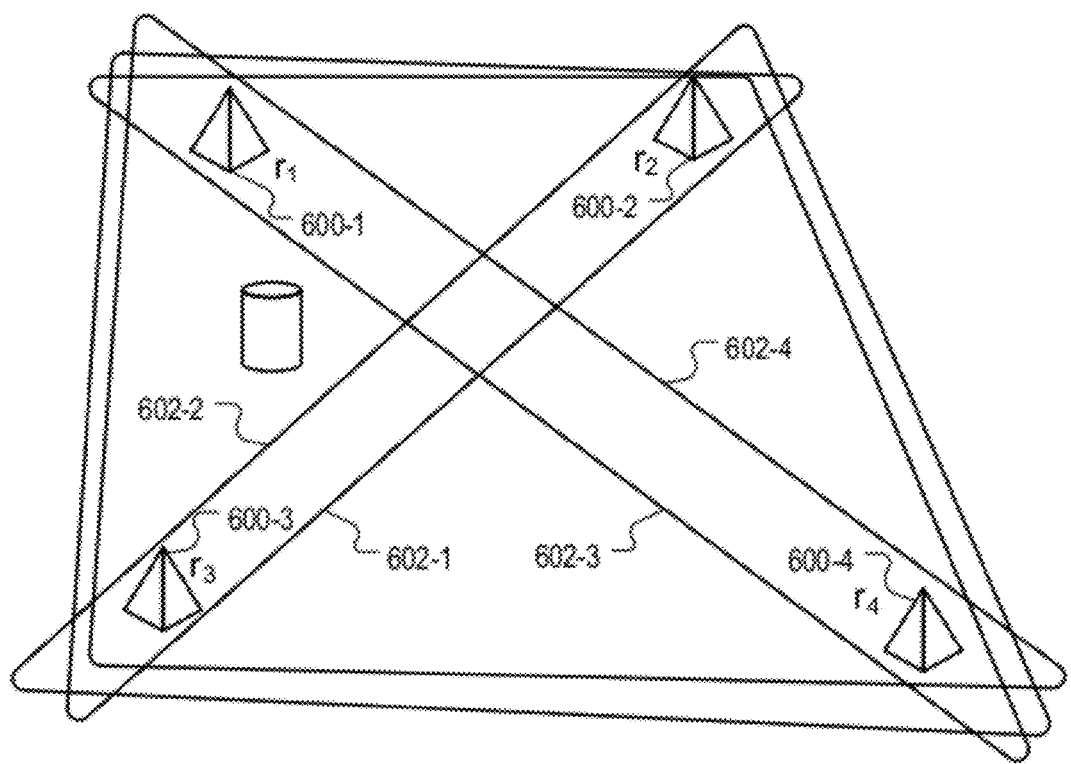
FIG. 6 schematically shows partitioning of a plurality of transmitters.

FIG. 6 schematically shows partitioning of a plurality of transmitters 600-1 through 600-4. Locations of the transmitters are indicated as $r_1$-$r_4$, respectively. The transmitters can be partitioned in groups having a predefined number of transmitters each. In some implementations, the minimum number of transmitters for a trilateration is three. The number of possible three-tower partitions when there are N transmitters (N being larger than 3) is $$M_3 := \binom{N}{3} = \frac{N!}{3!(N-3)!}$$

For example, the transmitters 600-1 through 600-4 can be partitioned into partitions 602-1 through 602-4 as indicated. A position estimation algorithm based on form factor can be used to calculate a position estimate solution for each of the partitions 602-1 through 602-4. For example, a value of the cost function for the solution and/or a clustering of estimates in the 2D plane can be considered. Based on this information, at least in part, a decision can be made whether any outlier estimates should be rejected. In such implementations, the remaining solution(s) can be used, for example to generate a committee consensus estimate for the full measurement set.

Figure 7:
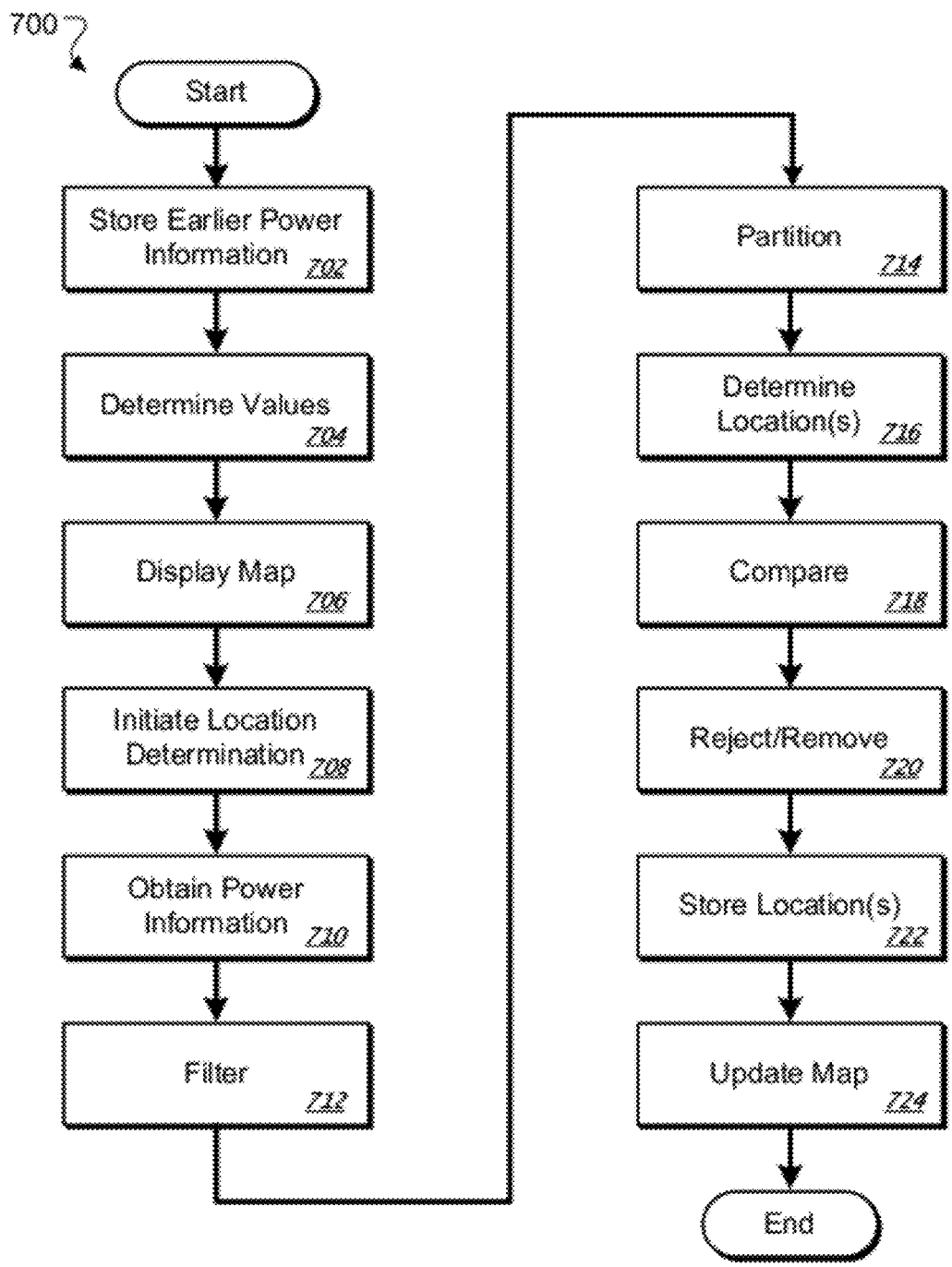
FIG. 7 shows an example of a method that can be performed to determine one or more locations.

FIG. 7 shows an example of a method 700 that can be performed to determine one or more locations. The method 700 can be performed by a processor executing instructions in a computer program product encoded on a tangible program carrier. For example, some or all of the method 700 can be performed in the mobile device 100.

In step 702, earlier power information can be stored. In some implementations, earlier power information indicating a detected power of respective signals received earlier from the multiple transmitters is stored. For example, the mobile device 100 and/or the wireless network 210 can store power information.

In step 704, one or more values can be determined. In some implementations, any or all of the constants γ, α and ρ and/or $a_0$, $a_1$ and $a_2$ can be determined. For example, the mobile device 100 and/or the wireless network 210 can perform the determination.

In step 706, a map can be displayed. In some implementations, a map is displayed on a display of a mobile device. For example, the map 502 can be displayed on the mobile device 100.

In step 708, location determination can be initiated. In some implementations, location determination is initiated upon receiving a user input in a mobile device indicating a request for the location to be determined. For example, a user can activate the current location object 514.

In step 710, power information is obtained. In some implementations, there is obtained, in a mobile device, power information indicating a detected power of respective signals received from a plurality of transmitters. For example, the mobile device 402 can obtain power information indicating a signal power relating to the access point 404 and/or the cell tower 406.

In step 712, filtering can be performed. In some implementations, one or more power readings can be filtered out. For example, a data set can be pre-filtered to determine whether any invalid data points and/or database entries should be removed or otherwise eliminated.

In step 714, partitioning can be performed. In some implementations, transmitters can be partitioned into groups of a predefined number of transmitters according to all possible groupings of the transmitters. For example, transmitters can be partitioned into any or all of the partitions 602-1 through 602-4.

In step 716, one or more locations can be determined. In some implementations, the location(s) can be determined based at least in part on: locations of the plurality of transmitters, a first function of the power information and a second function of respective locations of the plurality of transmitters. For example, the location(s) can be determined by finding a value of r so that E is minimized. In some implementations, a location of a mobile device can be determined using a formula that uses a first function of respective locations of the plurality of transmitters, the first function using at least one value determined by analyzing detected power of signals received at known locations.

In step 718, a comparison can be performed. In some implementations, determined location(s) can be compared to a predetermined number of locations determined previously. For example, the mobile device 100 can compare its most recently determined location to one or more determinations that were made most recently. In some implementations, an obtained power information can be compared with earlier power information before determining the location. For example, the mobile device 100 can compare its most recently obtained signal power from the access point 404 and/or the cell tower 406 to one or more signal powers that were obtained most recently.

In step 720, a rejection and/or removal can be performed. In some implementations, a determined location can be rejected upon determining that a difference in the determined location exceeds a threshold. For example, the mobile device 100 can rejected the most recently determined location if the location is more than a maximum distance from the most recently determined location(s). In some implementations, at least part of a power information for at least one of the transmitters can be removed upon determining that a difference in the detected power for the transmitter exceeds a threshold. For example, the mobile device 100 can remove the power information for the access point 404 and/or the cell tower 406 if the signal power is too much stronger or weaker than the most recently obtained signal power(s).

In step 722, location(s) can be recorded. For example, the location r determined by minimizing E can be recorded in the mobile device 100.

In step 724, the map can be updated. In some implementations, there can be placed on the map: a first indicator corresponding to the determined location and a second indicator indicating a determined certainty of the determined location. The placing can be performed in response to a user input in some implementations. For example, the geographic area 516 can be placed on the map 502.

Some or all steps of the method 700 can be omitted in some implementations. In some implementations, one or more additional steps can be performed. One or more steps can be repeated, performed earlier or later, and/or performed in a different order, to name just a few examples.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
obtaining, in a mobile device, power information indicating a detected power of respective signals received from a plurality of transmitters;
displaying a map on a display of the mobile device;
determining the location of the mobile device based at least in part on: locations of the plurality of transmitters, a first function of the power information and a second function of respective locations of the plurality of transmitters; and
in response to user input, placing a first indicator on the map corresponding to the determined location and a second indicator indicating a determined certainty of the determined location.

2. A method comprising:
obtaining, in a mobile device, power information indicating a detected power of respective signals received from a plurality of transmitters;
determining a location of the mobile device based at least in part on: locations of the plurality of transmitters, a first function of the power information and a second function of respective locations of the plurality of transmitters, wherein the location is determined based at least in part on a formula that depends on a $\log_{10}$ of the detected power and a $\log_{10}$ of a modeled transmitter power; and
in response to user input, placing, on a display of the mobile device a first indicator corresponding to the determined location and a second indicator indicating a determined certainty of the determined location.

3. The method of claim 1, wherein the location is determined based at least in part on a formula that depends on a $\log_{10}$ of the detected power and a $\log_{10}$ of a modeled transmitter power.

4. The method of claim 3, wherein the $\log_{10}$ of the modeled transmitter power has a linear relationship with a $\log_{10}$ of a distance between any of the plurality of transmitters and the mobile device.

5. The method of claim 4, wherein the linear relationship is:

$$10 \log_{10} F_n := 10 \log_{10} \gamma - 10\alpha L$$

wherein
$F_n$ is the modeled transmitter power of an nth transmitter;
$\gamma$ and $\alpha$ are values; and
L equals $\log_{10}|r - r_n|$ wherein r is the location to be determined and $r_n$ is the location of an nth transmitter.

6. The method of claim 5, further comprising:
determining $\gamma$ and $\alpha$ before determining the location including analyzing detected power of signals received at known locations.

7. The method of claim 3, wherein the $\log_{10}$ of the modeled transmitter power has a parabolic relationship with a $\log_{10}$ of a distance between any of the plurality of transmitters and the mobile device.

8. The method of claim 7, wherein the parabolic relationship is:

$$10 \log_{10} F_n := a_0 + a_1 L + a_2 L^2$$

wherein
$F_n$ is the modeled transmitter power of an nth transmitter;
$a_0$, $a_1$ and $a_2$ are values; and
L equals $\log_{10}|r - r_n|$ wherein r is the location to be determined and $r_n$ is the location of an nth transmitter.

9. The method of claim 8, further comprising determining $a_0$, $a_1$ and $a_2$ before determining the location including analyzing detected power of signals received at known locations.

10. The method of claim 1, wherein the location is determined based at least in part on a formula that includes:

$$E := \sum_{n=1}^{N} c_n(r, r_n, P_n)[d_n(P_n) - d_n(F_n)]^\beta.$$

wherein
E is an output of an error functional;
N is the number of the plurality of transmitters
$c_n$ is a penalty term;
r is the location of the mobile device;
$r_n$ is the location of transmitter n;

$P_n$ is the detected power of transmitter n;

$d_n$ is a function;

$F_n$ is a form factor reflecting a modeled power of transmitter n depending on the location of transmitter n; and wherein the location is determined by finding r so that E is minimized.

11. The method of claim 1, further comprising:

partitioning the plurality of transmitters into groups of a predefined number of transmitters according to all possible groupings of the plurality of transmitters;

wherein determining the location comprises determining a preliminary location, for each of the groups, using at least the information indicating the detected power from the transmitters in the group; and selecting the location from among the determined preliminary locations.

12. The method of claim 11, wherein the location is selected based on a value of a formula for the corresponding group, the formula using the locations of the plurality of transmitters, the first function and the second function.

13. The method of claim 11, wherein the location is selected based on a clustering of the preliminary locations.

14. The method of claim 1, further comprising:

comparing the determined location to a predetermined number of locations determined previously; and rejecting the determined location upon determining that a difference in the determined location exceeds a threshold.

15. The method of claim 1, further comprising:

storing earlier power information indicating a detected power of respective signals received earlier from the plurality of transmitters;

comparing the obtained power information with the earlier power information before determining the location.

16. The method of claim 15, further comprising:

removing at least part of the power information for at least one of the plurality of transmitters upon determining that a difference in the detected power for the transmitter exceeds a threshold.

17. A non-transitory computer-readable medium storing instructions executable by data processing apparatus to perform operations comprising:

obtaining, in a mobile device, power information indicating a detected power of respective signals received from a plurality of transmitters;

displaying a map on a display of the mobile device;

determining the location of the mobile device based at least in part on: locations of the plurality of transmitters, a first function of the power information and a second function of respective locations of the plurality of transmitters; and in response to user input, placing a first indicator on the map corresponding to the determined location and a second indicator indicating a determined certainty of the determined location.

18. The medium of claim 17, wherein the location is determined based at least in part on a formula that depends on a $\log_{10}$ of the detected power and a $\log_{10}$ of a modeled transmitter power.

19. The medium of claim 18, wherein the $\log_{10}$ of the modeled transmitter power has a linear relationship with a $\log_{10}$ of a distance between any of the plurality of transmitters and the mobile device.

20. The medium of claim 19, wherein the linear relationship is:

$$10\log_{10} F_n := 10\log_{10}\gamma - 10\alpha L$$

wherein $F_n$ is the modeled transmitter power of an nth transmitter;

$\gamma$ and $\alpha$ are values; and

L equals $\log_{10}|r-r_n|$ wherein r is the location to be determined and $r_n$ is the location of an nth transmitter.

21. The medium of claim 20, further comprising:

determining $\gamma$ and $\alpha$ before determining the location including analyzing detected power of signals received at known locations.

22. A system comprising:

one or more data processing apparatus; and a computer-readable medium storing instructions executable by data processing apparatus to perform operations comprising:

obtaining, in a mobile device, power information indicating a detected power of respective signals received from a plurality of transmitters;

displaying a map on a display of the mobile device;

determining the location of the mobile device based at least in part on: locations of the plurality of transmitters, a first function of the power information and a second function of respective locations of the plurality of transmitters; and in response to user input, placing a first indicator on the map corresponding to the determined location and a second indicator indicating a determined certainty of the determined location.

23. The system of claim 22, wherein the location is determined based at least in part on a formula that depends on a $\log_{10}$ of the detected power and a $\log_{10}$ of a modeled transmitter power.

24. The system of claim 23, wherein the $\log_{10}$ of the modeled transmitter power has a parabolic relationship with a $\log_{10}$ of a distance between any of the plurality of transmitters and the mobile device.

25. The system of claim 24, wherein the parabolic relationship is:

$$10\log_{10} F_n := a_0 + a_1 L + a_2 L^2$$

wherein $F_n$ is the modeled transmitter power of an nth transmitter;

$a_0$, $a_1$ and $a_2$ are values; and

L equals $\log_{10}|r-r_n|$ wherein r is the location to be determined and $r_n$ is the location of an nth transmitter.

26. The system of claim 25, the operations further comprising determining $a_0$, $a_1$ and $a_2$ before determining the location including analyzing detected power of signals received at known locations.

27. A non-transitory computer-readable medium storing instructions executable by data processing apparatus to perform operations comprising:

obtaining, in a mobile device, power information indicating a detected power of respective signals received from a plurality of transmitters;

determining a location of the mobile device based at least in part on: locations of the plurality of transmitters, a first function of the power information and a second function of respective locations of the plurality of transmitters, wherein the location is determined based at least in part on a formula that depends on a $\log_{10}$ of the detected power and a $\log_{10}$ of a modeled transmitter power; and in response to user input, placing, on a display of the mobile device, a first indicator corresponding to the determined location and a second indicator indicating a determined certainty of the determined location.

28. A system comprising:
one or more data processing apparatus; and
a computer-readable medium storing instructions executable by the one or more data processing apparatus to perform operations comprising:
  obtaining, in a mobile device, power information indicating a detected power of respective signals received from a plurality of transmitters;
  determining a location of the mobile device based at least in part on: locations of the plurality of transmitters, a first function of the power information and a second function of respective locations of the plurality of transmitters, wherein the location is determined based at least in part on a formula that depends on a $\log_{10}$ of the detected power and a $\log_{10}$ of a modeled transmitter power; and
  in response to user input, placing, on a display of the mobile device, a first indicator corresponding to the determined location and a second indicator indicating a determined certainty of the determined location.

* * * * *